United States Patent
Panzer et al.

(10) Patent No.: US 6,567,255 B1
(45) Date of Patent: May 20, 2003

(54) ELECTROMAGNETIC ACTUATOR

(75) Inventors: Karlheinz Panzer, Schwebheim (DE); Rudolf Stenger, Steinfeld (DE); Reiner Vathjunker, Partenstein (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/446,250

(22) PCT Filed: May 2, 1998

(86) PCT No.: PCT/EP98/02608

§ 371 (c)(1),
(2), (4) Date: Dec. 17, 1999

(87) PCT Pub. No.: WO98/59191

PCT Pub. Date: Dec. 30, 1998

(30) Foreign Application Priority Data

Jun. 19, 1997 (DE) .......................................... 197 25 918

(51) Int. Cl.$^7$ ............................................... H01H 47/00
(52) U.S. Cl. ........................................ 361/152; 361/171
(58) Field of Search ............................... 361/152, 153, 361/171, 172, 187, 189, 190; 307/326, 125, 130, 132 E, 140, 143, 412

(56) References Cited

U.S. PATENT DOCUMENTS

| | | | | |
|---|---|---|---|---|
| 4,628,885 A | * | 12/1986 | Ogburn et al. ............... | 123/490 |
| 5,309,314 A | * | 5/1994 | Loreck et al. ............... | 361/160 |
| 5,404,262 A | * | 4/1995 | Enomoto et al. ............ | 361/152 |

FOREIGN PATENT DOCUMENTS

| | | | | |
|---|---|---|---|---|
| DE | 1500104 | 5/1969 | ............ | F16K/31/02 |
| DE | 3506849 | 6/1986 | ............ | H01F/7/18 |
| DE | 3843138 | 6/1990 | ............ | H01F/7/18 |
| DE | 4010232 | 10/1991 | ............ | H01F/7/18 |
| DE | 4202601 | 8/1993 | ............ | H01F/7/18 |
| DE | 4202805 | 8/1993 | ............ | H01F/7/18 |
| DE | 4140586 | 1/1994 | ............ | H01F/7/18 |
| DE | 4434684 | 4/1996 | ............ | H01F/7/18 |
| EP | 0691464 | 1/1996 | ............ | H01H/47/37 |
| WO | 85202236 | 8/1982 | ............ | F16K/31/07 |

OTHER PUBLICATIONS

"Elektrisches Verstärker–Modul . . . Rckführung" Type VT 11080, Series 2X, Mannesmann Rexroth Gmbh, RD 29 757/04.93 (pp. 1–4).

"Verlustarme Ansteuerung von Aktuatoren" In Electronik, 23/ Nov. 13, 1987, by Herbert Sax.

* cited by examiner

*Primary Examiner*—Ronald W. Leja
(74) *Attorney, Agent, or Firm*—Martin A. Farber (57) ABSTRACT

An electromagnetic actuator with a control circuit, a combinational circuit and a power section as well as with a magnetic coil, which is connected via electrical lines to the output of the power section, the output signal of the control circuit is passed on to the power section only when, in addition to the output signal of the control circuit, the combinational circuit is fed a release signal. For safety reasons, current is to flow via the magnetic coil only when the release signal is simultaneously available. For monitoring the effectiveness of the combination of the output signal of the control circuit connected upstream of the power section with the release signal with respect to the current flow via the magnetic coil, the voltage of that line which is supplied with the operating voltage on activation of the power section is fed to an evaluation circuit. The evaluation circuit has a threshold switch, which converts the voltage fed to it into a switching signal. The threshold voltage of the threshold switch is slightly greater than the reference potential. The actuator is particularly suited for hydraulic or pneumatic proportional valves in applications with increased safety requirements.

7 Claims, 6 Drawing Sheets

FIG. 6

ELECTROMAGNETIC ACTUATOR

FIELD AND BACKGROUND OF THE INVENTION

The invention concerns an electromagnetic actuator.

An actuator comprises a control circuit, a combinational circuit and a power section. The control circuit converts a control signal into a signal suitable for activating the power section. The combinational circuit combines the output signal of the control circuit with a release signal in such a way that the output signal of the control circuit is passed on to the power section only when the release signal is available. Connected to the power section via two lines is a magnetic coil. On activation, the power section effects a current flow from an operating voltage via the magnetic coil to a reference potential. A final control element contained in the power section determines the level of the current flowing via the magnetic coil to correspond to the output signal of the control circuit passed on to the power section. The final control element may operate in a continuous or clocked mode. In the first case, the magnetic coil is constantly supplied with a voltage, the level of which determines the current flowing via the magnetic coil. In the second case, the magnetic coil is fed the operating voltage in a clocked mode, the average value of the current flowing via the magnetic coil being determined by the duty factor of the clock pulses fed to the power section. If the control voltage is in analog form, the control circuit converts the control voltage into clock pulses, the duty factor of which is determined by the level of the control voltage.

Such an actuator, in which the magnetic coil is fed the operating voltage in clocked mode, is known from the document "Elektrisches Verstärker-Modul zur Ansteuerung von direktgesteuerten Regelventilen mit elektrischer Rückführung—Typ VT 11080, Serie 2X" [electrical amplifier module for the activation of direct-controlled control valves with electrical feedback—type VT 11080, series 2X], RD 29 757/04.93 of Mannesmann Rexroth GmbH. The block diagram presented in this document shows an electromagnetic actuator for a hydraulic control valve with two magnetic coils. Each magnetic coil is connected via two electrical lines to the output of in each case one power section of the actuator. Arranged between the output of a PI controller and each power section there is in each case a control circuit. The output signal of the PI controller is fed to the control circuits as a control voltage. Each control circuit converts the control voltage, present as an analog signal, into clock signals, which activate the downstream power section in such a way that the average value of the current flowing via the magnetic coil corresponds to the level of the control voltage. In addition, the control voltages have the function of a combinational circuit. In addition to the control signal, each control circuit is fed a release signal. The control circuit combines the release signal with the clock signals in such a way that the magnetic coils are fed the operating voltage only when the release signal is simultaneously available. If the release signal is not available, the magnetic coils are not fed any operating voltage via the respectively assigned power sections. The combination of the clock pulses with the release signal is intended to ensure that the magnetic coils are supplied with current only when, in addition to a control signal other than zero, the release signal is also available. The combination of the clock signals with the release signal increases the dependability of the actuator, since the magnetic coils are supplied with current only when the release signal is available in addition to the control signal. In applications with increased safety requirements, such as hydraulically operated presses for example, this measure is not sufficient, however, since it is not possible to rule out the possibility of voltage still being fed to the magnetic coils when there is no release signal. This is the case, for example, when there is a short circuit between the operating voltage and the lines leading to the magnetic coils. Such a malfunction also occurs if an electronic switch on the operating voltage side of a power section no longer assumes the blocking state, for example after overloading. Such malfunctions can occur not only in the case of actuators with final control elements operating in a clocked mode but also in the case of actuators with final control elements operating in a continuous mode.

SUMMARY OF THE INVENTION

The invention is based on the object of providing an actuator of the type stated at the beginning which allows monitoring of the effectiveness of the combination of the output signal of the control circuit upstream of the power section with the release signal with respect to the current.

This object is achieved by the features characterized according to the invention the evaluation circuit generates a switching signal, which assumes a first value as long as current flows via the magnetic coil and assumes a second value if virtually no current flows via the magnetic coil. The formation of this signal takes place independently of the formation of a current actual-value signal provided for controlling the level of the current flowing via the magnetic coil. As long as a change of the output signal of the evaluation circuit from the first value to the second value takes place when the release signal is switched off, the combination of the control signal and release signal is effective. If, on the other hand, the output signal of the evaluation circuit assumes the first value without the release signal being available, an error has occurred.

Advantageous developments of the invention are the following. The diode between the input of the evaluation circuit and the input of the threshold switch decouples the input voltage of the threshold switch from the voltage of the line leading to the magnetic coil. The capacitor ensures that the input voltage of the threshold switch does not drop below the threshold voltage of the threshold switch during the interpulse periods in clocked activation of the final control element. The resistor ensures discharging of the capacitor after the ending of the activation of the power section. If the evaluation circuit is fed the voltages of the two lines leading to the magnetic coil, the smoothing effort for the input voltage of the threshold switch is reduced. Furthermore, the zero transition of the current flowing via the magnetic coil can be sensed more exactly. If the decay time constant of the input voltage of the threshold switch is greater than the decay time constant of the current flowing via the magnetic coil, the voltage fed to the threshold switch falls below the threshold voltage of the threshold switch only when the current flowing via the magnetic coil has become zero. Since, in the conducting-state phase of the current flowing via the magnetic coil, current also flows via the resistor of the evaluation circuit, a high-impedance resistance in comparison with the resistance of the magnetic coil reduces the current requirement of the actuator. If the evaluation circuit is provided with further inputs, it is possible in the case of actuators with two magnetic coils to monitor the voltages of the lines leading to the magnetic coils with only one evaluation circuit.

BRIEF DESCRIPTION OF THE DRAWINGS

The invention is more precisely explained below with its further details on the basis of exemplary embodiments represented in the drawings, in which.

DETAILED DESCRIPTION OF THE PREFERRED EMBODIMENT

Figure 1:
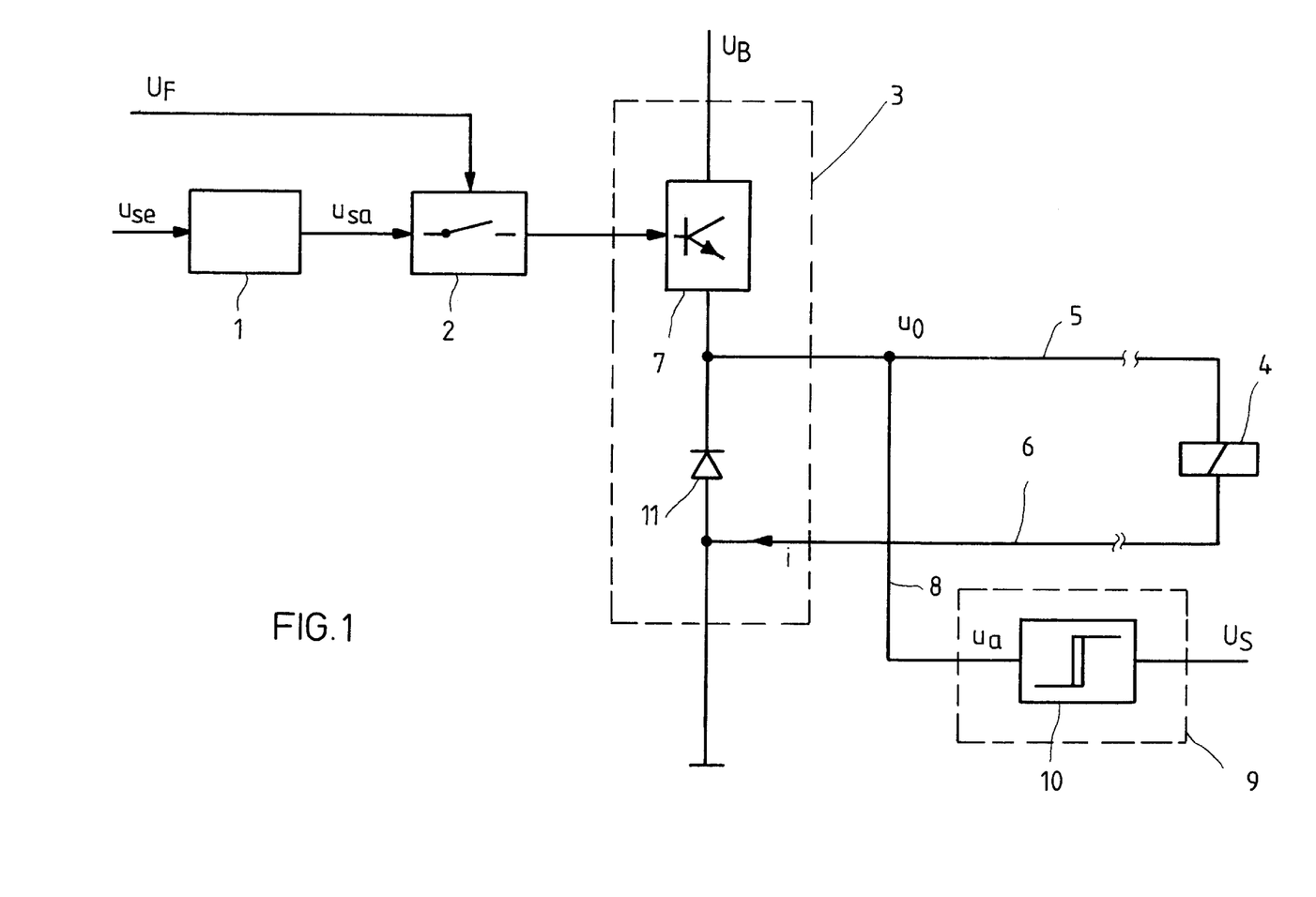
FIG. 1 shows in schematic representation the circuit diagram of an actuator according to the invention with a final control element operating in a continuous mode in the power section.

FIG. 1 shows the circuit diagram of a first actuator according to the invention in schematic representation. Connected downstream of a control circuit 1 are a combinational circuit 2 and a power section 3. The control circuit 1 converts a voltage $u_{se}$, in the form of an analog signal, into a voltage $u_{sa}$. The voltage $u_{sa}$ is the output signal of the control circuit 1. As in the case of the voltage $u_{se}$, the signal is an analog signal. The combinational circuit 2 is formed as an electronic switch. It passes the voltage $u_{sa}$ on to the power section 3 only if a release signal $U_F$ is available. If the release signal $U_F$ is not available, no activation of the power section 3 takes place. A magnetic coil 4, for example the magnetic coil of an electro-hydraulic proportional valve, is connected via two lines 5 and 6 to the output of the power section 3. The power section 3 contains a final control element 7 operating in a continuous mode, for example a transistor. When the final control element 7 is activated, a current i flows from an operating voltage $U_B$ via the final control element 7, the line 5, the magnetic coil 4 and the line 6 to a reference potential. The voltage $u_{sa}$, passed on via the combinational circuit 2 to the final control element 7, determines the level of the current i flowing via the magnetic coil 4. Arranged between the lines 5 and 6 is a diode 11, serving as a freewheeling diode. In the circuit diagram represented in FIG. 1, the line 6 is constantly connected to the reference potential. The voltage of the line 5 is denoted by $u_o$. It adjusts itself to correspond to the activation of the final control element 7 of the power section 3. If no current is flowing via the magnetic coil 4, the line 5 is at reference potential. The voltage $u_o$ of the line 5 is then zero. As long as a current i is flowing from the operating voltage $U_B$ via the magnetic coil 4 to the reference potential, the voltage $u_o$ is greater than zero. When the final control element 7 is blocked, the voltage $u_o$ is reduced and becomes less than zero. Once the voltage $u_o$ has reached the forward voltage of the diode 11, the current i flowing via the magnetic coil 4 decays. The voltage $u_o$ is in this case limited to the forward voltage of the diode 11. As long as current is flowing via the diode 11, the voltage $u_o$ on the line 5 is less than the reference potential by the amount of the forward voltage of the diode 11. Once the current flowing via the diode 11 has decayed, the line 5 is at reference potential.

A line 8 connects the line 5 to an evaluation circuit 9. The evaluation circuit 9 contains a threshold switch 10. The voltage fed to the threshold switch 10 is denoted by $u_a$. In the circuit diagram represented in FIG. 1, the voltage $u_a$ is identical to the voltage $U_o$. The output signal of the threshold switch 10 is a switching signal $U_S$. The switching signal $U_S$ is at the same time the output signal of the evaluation circuit 9. The switching signal $U_S$ is available when the voltage $u_a$ is greater than a threshold voltage $U_{a0}$. If, on the other hand, the voltage $u_a$ is less than the threshold voltage $U_{a0}$, the switching signal $U_S$ is not available. The threshold voltage $U_{a0}$ is chosen such that it is only slightly greater than the reference potential. The switching signal $U_S$ is always available when current flows from the operating voltage $U_B$ via the magnetic coil 4 to the reference potential. The switching signal $U_S$ is not available if the voltage $u_o$ is less than the threshold voltage $U_{a0}$. This is the case when the current flowing via the magnetic coil 4 decays to zero after the blocking of the final control element 7 via the diode 11 and when the current flowing via the magnetic coil 4 has decayed completely.

In the following, an available release signal $U_F$ or switching signal $U_S$ is assigned the logical value "1". If the release signal $U_F$ or the switching signal $U_S$ is not available, it is assigned the logical value "0". When the actuator is functioning properly, the switching signal $U_S$ changes from "1" to "0" when the release signal $U_F$ changes from "1" to "0". As long as these changes take place, the combination of the voltage $u_{sa}$ with the release signal $U_F$ by the combinational circuit 2 is effective. If, on the other hand, the switching signal $U_S$ retains the logical value "1" when the release signal $U_F$ changes from "1" to "0", there is a fault. Since the switching signal $U_S$ assumes the logical value "1" when the voltage $u_a$ is greater than the threshold voltage $U_{a0}$, the voltage $u_o$ of the line 5 is consequently also greater than the reference potential. This means that current flows via the magnetic coil 4 to the reference potential although the release signal $U_F$ is no longer available. Such a fault occurs, for example, when there is a short circuit between the operating voltage $U_B$ and the line 5. This also includes a short circuit of the final control element 7 after overloading. Such a fault may also occur when there is a short circuit between the input and the output of the combinational circuit 2. Allowance for the time which the current flowing via the magnetic coil 4 requires to decay to zero after the blocking of the final control element 7 can be achieved by a timing element, not represented in FIG. 1, which appropriately delays the change of the switching signal $U_S$, in particular from "1" to "0".

Figure 2:
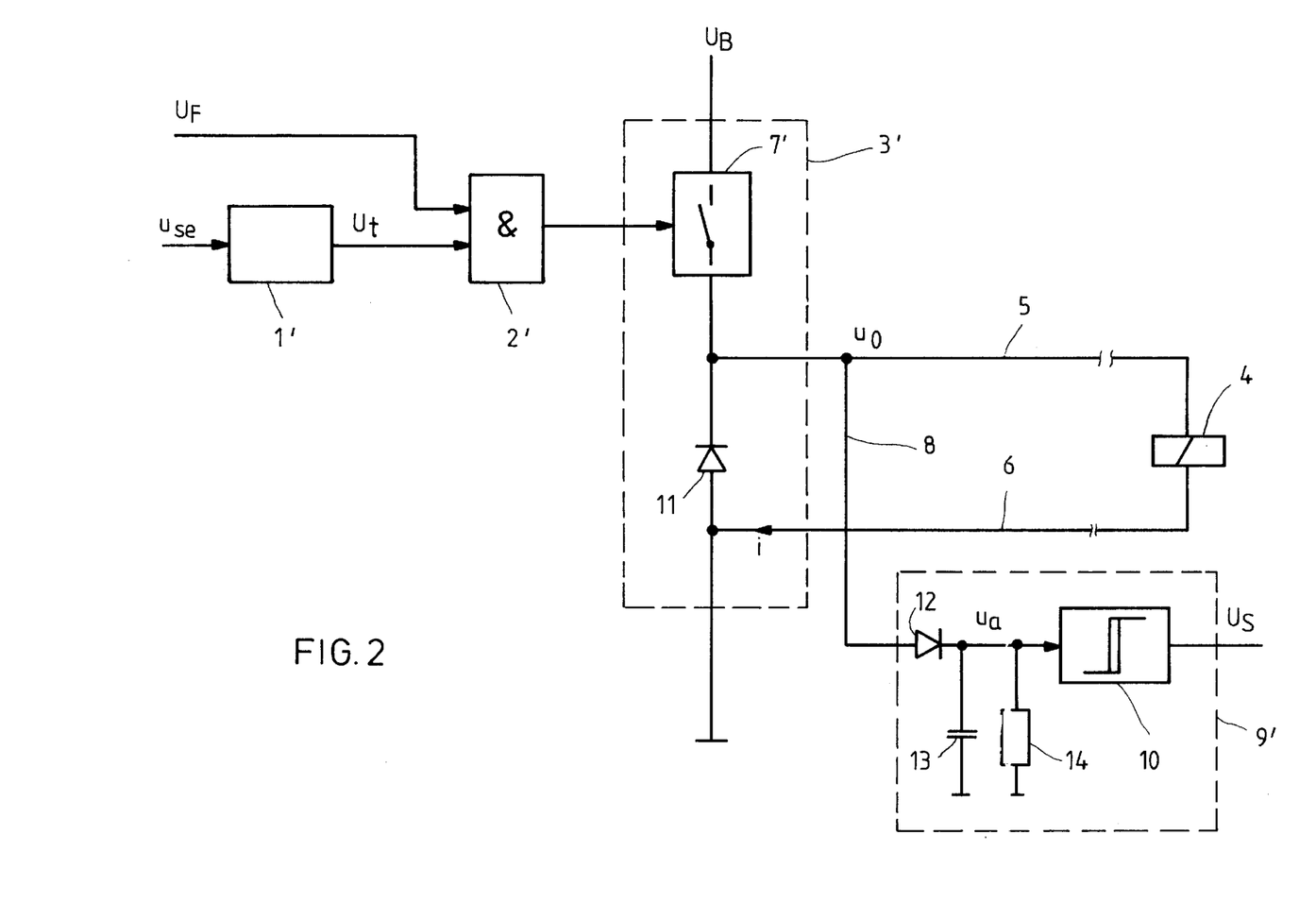
FIG. 2 shows in schematic representation the circuit diagram of an actuator according to the invention with a final control element operating in a clocked mode in the power section.

FIG. 2 shows the circuit diagram of an actuator according to the invention with a final control element operating in a clocked mode in the power section. A control circuit 1' converts the voltage $u_{se}$, in the form of an analog signal, into a clocked signal $U_t$, the duty factor of which corresponds to the level of the voltage $u_{se}$. Designated here as the duty factor is the on-time in relation to the sum of the on-time and the off-time following the latter. The clocked signal $U_t$, as in the case of the release signal $U_F$ and the switching signal $U_S$, is assigned the logical values "0" and "1". A combinational circuit 2', acting as an AND gate, passes the clocked signal $U_t$ on to the power section 3' only when the clocked signal $U_t$ and the release signal $U_F$ simultaneously have the logical value "1". If the release signal $U_F$ is not available, no activation of the power section 3' takes place. The power section 3' contains a final control element 7' operating in a clocked mode, for example a MOS field-effect transistor serving as an electronic switch. When the final control element 7' is conducting, a current i flows from the operating voltage $U_B$ via the final control element 7', the line 5, the magnetic coil 4 and the line 6 to the reference potential. Arranged between the lines 5 and 6 is a diode 11. It serves, when the final control element 7' is not conducting, as a freewheeling diode for the current i flowing via the magnetic coil 4. With a constant operating voltage $U_B$, the average value over time of the current i flowing via the magnetic coil 4 is proportional to the duty factor of the clocked signal $U_t$.

The line 5 is connected via the line 8 to an evaluation circuit 9'. The evaluation circuit 9', like the evaluation circuit 9 in FIG. 1, contains a threshold switch 10. The voltage $u_o$ on the line 5 is fed to the threshold switch 10 via a diode 12. Arranged between the input of the threshold switch 10 and the reference potential is the parallel connection of a capacitor 13 and a resistor 14. The diode 12 decouples the voltage $u_a$, fed to the input of the threshold switch 10, from the voltage $u_o$. The capacitor 13 smooths the voltage $u_a$, the resistor 14 serves as a bleed resistor. As described above with reference to FIG. 1, the switching signal $U_S$ assumes the logical value "1" if the voltage $u_a$ is greater than the threshold voltage $U_{a0}$. If the voltage $u_a$ is less than the threshold voltage $U_{a0}$, the switching signal $U_S$ assumes the logical value "0".

In the conducting-state phase, i.e. when final control element 7' is conducting, current flows from the operating voltage $U_B$ via the final control element 7', the line 5, the magnetic coil 4 and the line 6 to the reference potential. The voltage $U_o$ on the line 5 is in this phase virtually equal to the operating voltage $U_B$. In the blocking-state phase, i.e. when final control element 7' is not conducting, the current initially continues to flow at the same level via the diode 11 and is then reduced in accordance with an exponential function, the time constant of which is essentially determined by the inductance of the magnetic coil and the ohmic resistance of the magnetic coil 4 as well as of the lines 5 and 6.

Figure 3:
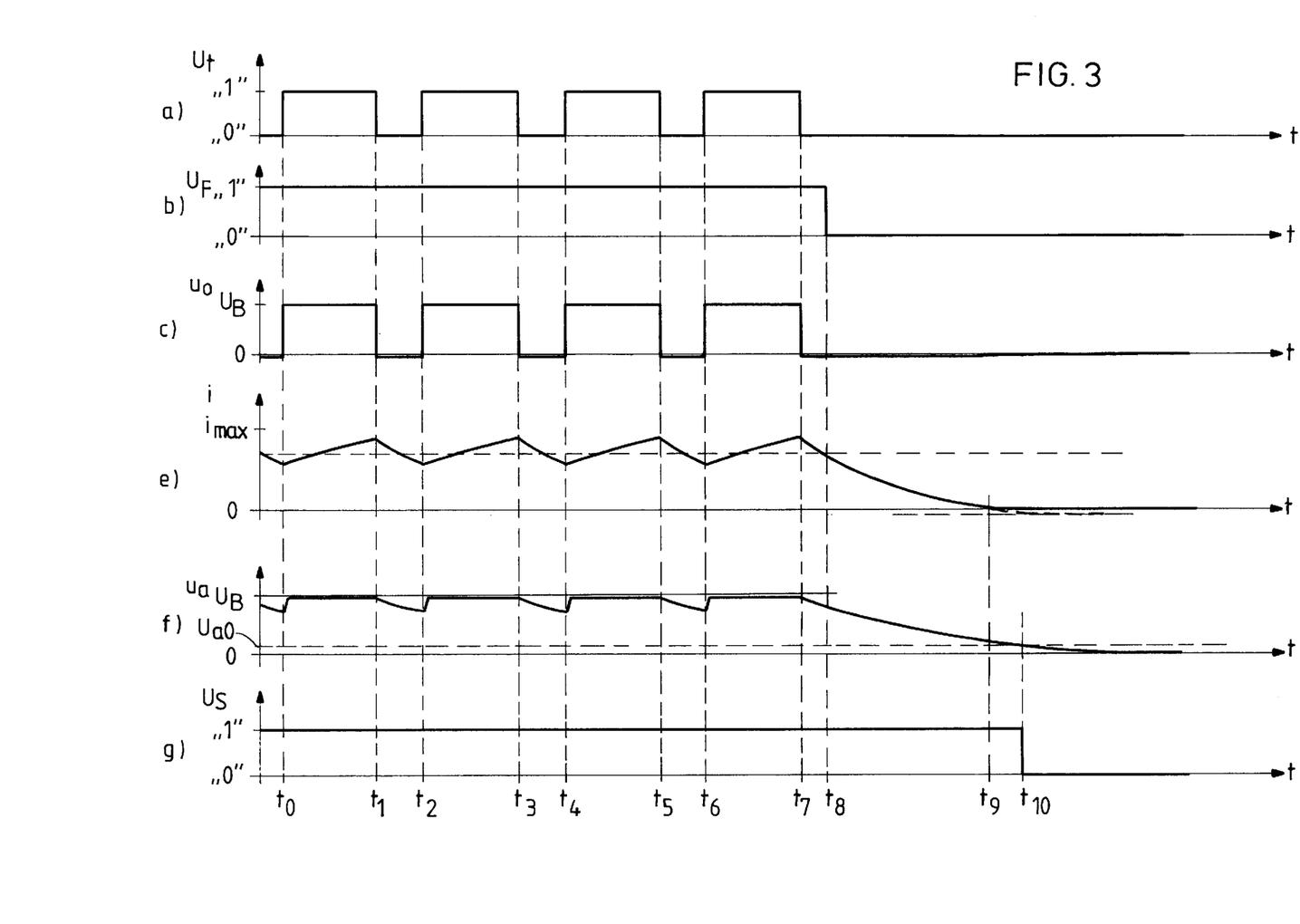
FIG. 3 shows the variation over time of individual signals of the actuator according to FIG. 2.

FIG. 3 shows in a number of diagrams, arranged one beneath the other, the variation over time of selected signals of the actuator according to FIG. 2. In this figure:

FIG. 3a shows the clocked signal $U_t$ with the logical values "0" and "1",

FIG. 3b shows the release signal $U_F$ with the logical values "0" and "1",

FIG. 3c shows the voltage $u_o$ on the line 5 in the range between zero and the operating voltage $U_B$, FIG. 3e shows the current i flowing via the magnetic coil 4 between zero and the maximum current $i_{max}$, occurring when there is a duty factor of 100%, FIG. 3f shows the voltage $u_a$ at the input of the threshold switch 10 between zero and the operating voltage $U_B$ and FIG. 3g shows the switching signal $U_S$ with the logical values "0" and "1".

The release signal $U_F$ (FIG. 3b) has the logical value "1" up until the instant $t_8$. In this time period, the magnetic coil 4 is supplied with the operating voltage $U_B$ in a way corresponding to the clocked signal $U_t$ (FIG. 3a). The variation over time of the voltage $u_o$ on the line 5 (FIG. 3c) in this case corresponds to the variation over time of the clocked signal $U_t$. The current i (FIG. 3e) increases in each case in the conducting-state phases, i.e. in the time periods $t_0$ to $t_1$, $t_2$ to $t_3$, $t_4$ to $t_5$ and $t_6$ to $t_7$, in accordance with an exponential function. In the blocking-state phases, i.e. in the time periods $t_1$ to $t_2$, $t_3$ to $t_4$, $t_5$ to $t_6$ and as from the instant $t_7$, the current i decays in accordance with an exponential function. At the instant $t_9$, the current i has become zero. In the conducting-state phases, the voltage $u_a$ fed to the input of the threshold switch 10 (FIG. 3f) is, after a brief charging operation of the capacitor 13, equal to the voltage $u_o$ reduced by the amount of the forward voltage of the diode 12. In the blocking-state phases, the capacitor 13 is discharged via the resistor 14 in accordance with an exponential function. The time constant of this exponential function is determined by the product of the resistance value of the resistor 14 and the capacitance of the capacitor 13. It is advantageous to choose this time constant to be greater than the time constant with which the current i flowing via the magnetic coil 4 in the blocking-state phase decays. With this dimensioning of the time constants, the current i has already become zero when the voltage $u_a$ falls below the threshold voltage $U_{a0}$ at the instant $t_{10}$. At this instant, the switching signal $U_S$ (FIG. 3g) changes from the logical value "1" to the logical value "0".

When the actuator is functioning properly, the logical value of the switching signal $U_S$ changes from "1" to "0" after the release signal $U_F$ has changed—as described with reference to FIG. 3—from "1" to "0". The change of the switching signal $U_S$ from "1" to "0" follows the change of the release signal $U_F$ from "1" to "0" with a delay determined by the time period $t_{10}$-$t_8$. As long as such a change takes place, the combination of the clocked signal $U_t$ with the release signal $U_F$ by the combinational circuit 2' is effective. If, on the other hand, the switching signal $U_S$ retains the logical value "1" when the release signal $U_F$ has changed from "1" to "0", there is a fault. Since the switching signal $U_S$ assumes the logical value "1" when the voltage $u_a$ is greater than the threshold voltage $U_{a0}$, the voltage $u_o$ of the line 5 is consequently also greater than the reference potential. This means that current flows via the magnetic coil 4 although the release signal $U_F$ is no longer available. Such a fault occurs, for example, when there is a short circuit between the operating voltage $U_B$ and the line 5. This also includes a short circuit of the final control element 7' after overloading. Such a fault may also occur when there is a short circuit between the input and the output of the combinational circuit 2'. The evaluation of the switching signal $U_S$ in dependence on the release signal $U_F$, described above in a general form, can be automated by means of logical combinational elements interconnected in an appropriate way, so that in the case of a fault, either switching off or initially only fault signaling takes place.

Figure 4:
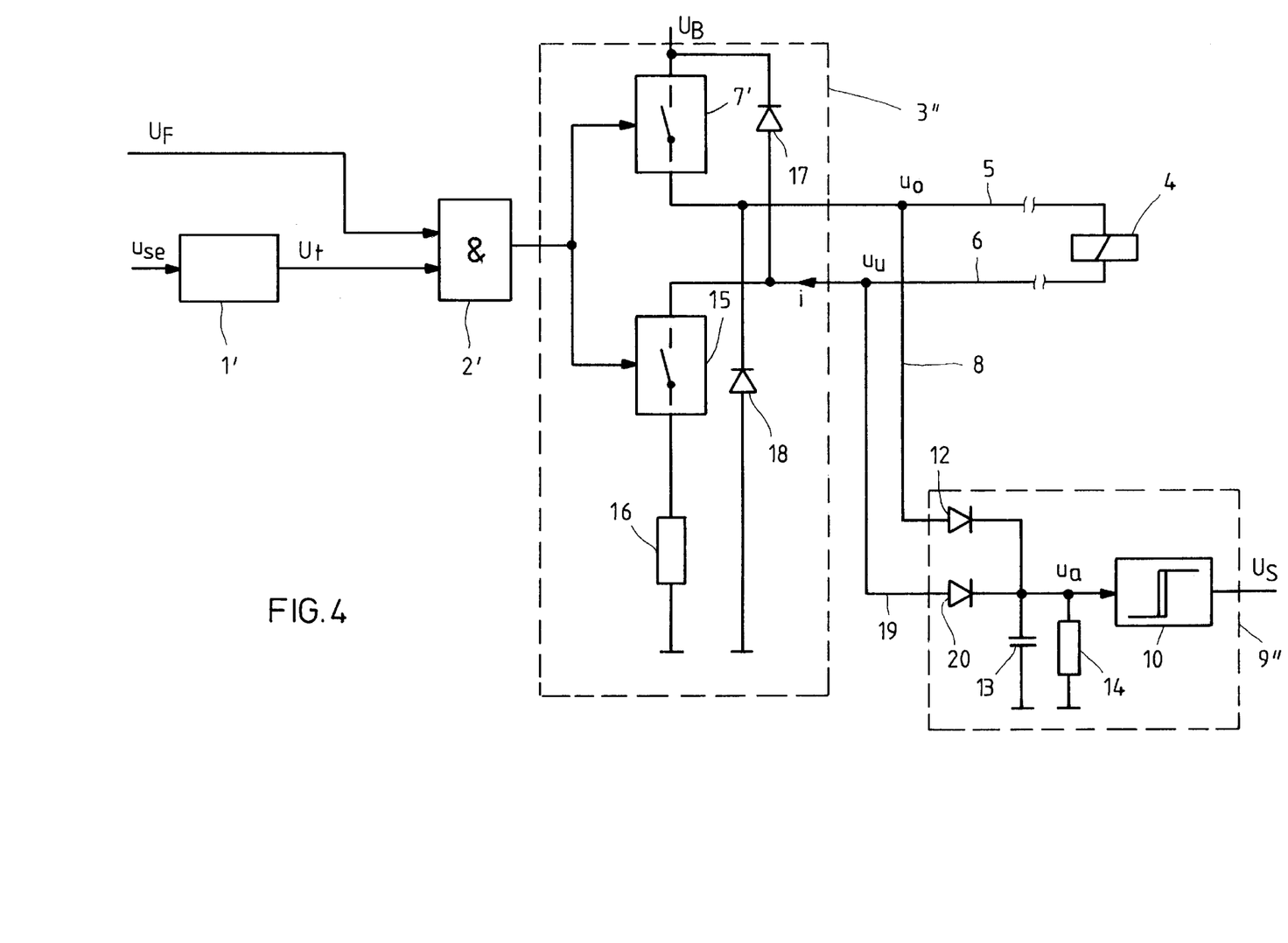
FIG. 4 shows in schematic representation the circuit diagram of an actuator according to the invention with two final control elements operating in a clocked mode in the power section.

FIG. 4 shows the circuit diagram of an actuator according to the invention with two final control elements operating in a clocked mode in the power section. This actuator is based on the actuator represented in FIG. 2. The same components are provided with the same designations. The power section 3" contains in addition to the final control element 7' a further final control element 15. As in the case of the final control element 7', the final control element 15 is an electronic switch, for example a MOS field-effect transistor. The final control elements 7' and 15 are effectively activated by the output signal of the combinational circuit 2'. When final control elements 7' and 15 are conducting, the current i flows from the operating voltage $U_B$ via the final control element 7', the line 5, the magnetic coil 4, the line 6, the final control element 15 and a measuring resistor 16 to the reference potential. The voltage dropping across the measuring resistor 16 is a measure of the current flowing via the magnetic coil 4 in the conducting-state phase. It serves as an actual value for a control, not represented here, of the current i flowing via the magnetic coil 4. The resistance value of the measuring resistor 16 is small in comparison with the resistance value of the magnetic coil 4. Such a measuring resistor may be provided in the same way also in the actuators represented in FIGS. 1 and 2. The line 6 is connected via a diode 17 to the operating voltage $U_B$. The line 5 is connected via a further diode 18 to the reference potential.

The line 5 is connected via the line 8 to a first input of an evaluation circuit 9". The line 6 is connected via a line 19 to a second input of the evaluation circuit 9". The evaluation circuit 9", like the evaluation circuits 9 and 9', contains a threshold switch 10. The voltage $u_o$ on the line 5 is fed to the threshold switch 10 via the diode 12. In addition, the threshold switch 10 is fed the voltage $u_u$ on the line 6 via a diode 20. The diodes 12 and 20 decouple the voltage $u_a$, fed to the input of the threshold switch 10, from the voltages $u_o$ and $u_u$. The input of the threshold switch 10 is in each case fed the higher of the voltages $u_o$ or $u_u$. As already described above, the switching signal $U_S$ assumes the logical value "1" if the voltage $u_a$ is greater than the threshold voltage $U_{a0}$. If the voltage $u_a$ is less than the threshold voltage $U_{a0}$, the switching signal $U_S$ assumes the logical value "0".

In the conducting-state phase, i.e. when final control elements 7' and 15 are conducting, the current i flows from the operating voltage $U_B$ via the final control element 7', the line 5, the magnetic coil 4, the line 6, the final control element 15 and the measuring resistor 16 to the reference potential. The voltage $u_o$ on the line 5 is in this phase virtually equal to the operating voltage $U_B$. The voltage $u_u$ on the line 6 is slightly greater than the reference potential because of the voltage drop across the measuring resistor 16. In the blocking-state phase, i.e. when final control elements 7' and 15 are not conducting, the current i flowing via the magnetic coil 4 initially flows at the same level further via the diode 17 to the operating voltage $U_B$ and from the reference potential of the operating voltage $U_B$ via the diode 18 back to the magnetic coil 4. The current i is reduced thereby in accordance with an exponential function, the time constant of which is essentially determined by the level of the voltage difference $u_o-u_u$ as well as by the inductance of the magnetic coil 4 and by the ohmic resistance of the magnetic coil 4.

Figure 5:
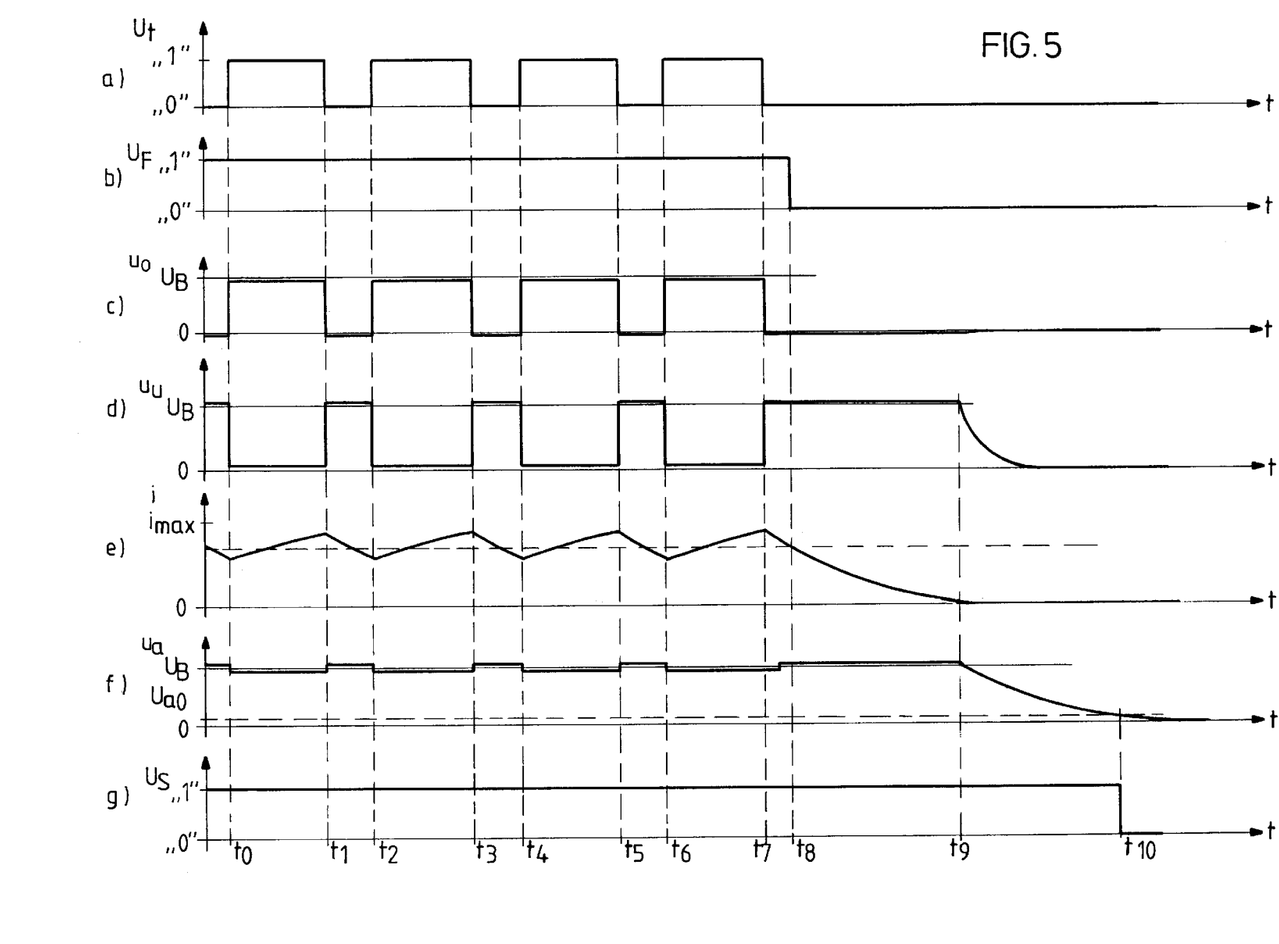
FIG. 5 shows the variation over time of individual signals of the actuator according to FIG. 4

FIG. 5 shows in a number of diagrams, arranged one beneath the other, the variation over time of selected signals of the actuator according to FIG. 4. In this figure:

FIG. 5a shows the clocked signal $U_t$ with the logical values "0" and "1",

FIG. 5b shows the release signal $U_F$ with the logical values "0" and "1",

FIG. 5c shows the voltage $u_o$ on the line 5 in the range between zero and the operating voltage $U_B$, FIG. 5d shows the voltage $u_u$ on the line 6 in the range between zero and the operating voltage $U_B$, FIG. 5e shows the current i flowing via the magnetic coil 4 between zero and the maximum current $i_{max}$ occurring when there is a duty factor of 100%, FIG. 5f shows the voltage $u_a$ at the input of the threshold switch 10 between zero and the operating voltage $U_B$ and FIG. 5g shows the switching signal $U_S$ with the logical values "0" and "1".

The release signal $U_F$ (FIG. 5b) has the logical value "1" up until the instant $t_8$. In this time period, the magnetic coil 4 is supplied with the operating voltage $U_B$ in a way corresponding to the clocked signal $U_t$ (FIG. 5a). The variation over time of the voltage $u_o$ on the line 5 (FIG. 5c) in this case corresponds to the variation over time of the clocked signal $U_t$. The variation over time of the voltage $u_u$ on the line 6 (FIG. 5d) is virtually inverted in comparison with the variation over time of the voltage $u_o$. The current i (FIG. 5e) increases in each case in the conducting-state phases, i.e. in the time periods $t_0$ to $t_1$, $t_2$ to $t_3$, $t_4$ to $t_5$ and $t_6$ to $t_7$, in accordance with an exponential function. In the blocking-state phases, i.e. in the time periods $t_1$ to $t_2$, $t_3$ to $t_4$, $t_5$ to $t_6$ and as from the instant $t_7$, the current i decays in accordance with an exponential function. At the instant $t_9$, the current i has become zero. As long as the current i is still flowing, that is between the instants $t_7$ and $t_9$, the line 6 is supplied with a voltage which is greater than the operating voltage $U_B$ by the amount of the forward voltage of the diode 17. Only from the instant $t_9$ does the voltage $u_u$ decrease. On account of stray capacitances and creepage currents, the voltage $u_u$ decreases in accordance with a time function. In the conducting-state phases, the voltage $u_a$ fed to the input of the threshold switch 10 (FIG. 5f) is equal to the voltage $u_o$ reduced by the amount of the forward voltage of the diode 12. In the blocking-state phases, the voltage $u_a$ fed to the input of the threshold switch 10 (FIG. 5f) is equal to the voltage $u_u$ reduced by the amount of the forward voltage of the diode 20. On account of the forward voltage of the diode 17, the voltage $u_a$ in the blocking-state phases is slightly greater than in the conducting-state phases. The voltage $u_a$ is, however, greater than the threshold voltage $U_{a0}$ both in the conducting-state phases and in the blocking-state phases, so that the switching signal $U_S$ retains the logical value "1". With the decay of the voltage $u_u$ after the instant $t_9$, the capacitor 13 is discharged via the resistor 14 in accordance with an exponential function. Since the voltage $u_a$ is decoupled from the voltage $u_u$ by the diode 20, the voltage $u_a$ can decay more slowly than the voltage $u_u$. The time constant of the exponential function with which the voltage $u_a$ decays is determined by the product of the resistance value of the resistor 14 and the capacitance of the capacitor 13. It serves mainly for suppressing faults. It may be chosen to be less than the corresponding time constant of FIG. 2, since the discharging of the capacitor 13 only takes place when the current i has already become zero. The voltage $u_a$ falls below the threshold voltage $U_{a0}$ at the instant $t_{10}$ after the current i has become zero at the instant $t_9$. At the instant $t_{10}$, the switching signal $U_S$ (FIG. 5g) changes from the logical value "1" to the logical value "0".

When the actuator is functioning properly, in the case of the actuator represented in FIG. 4, the logical value of the switching signal $U_S$ changes from "1" to "0" after the release signal $U_F$ has changed from "1" to "0". The change of the switching signal $U_S$ from "1" to "0" follows the change of the release signal $U_F$ from "1" to "0" with a delay determined by the time period $t_{10}$–$t_8$. As long as such a change takes place, the combination of the clocked signal $U_t$ with the release signal $U_F$ by the combinational circuit 2' is effective. If, on the other hand, the switching signal $U_S$ retains the logical value "1" when the release signal $U_F$ has changed from "1" to "0", there is a fault. Since the switching signal $U_S$ assumes the logical value "1" when the voltage $u_a$ is greater than the threshold voltage $U_{a0}$, it can be concluded that the voltage $u_o$ on the line 5 or the voltage $u_u$ on the line 6 is greater than the reference potential. This means that a fault must have occurred, since in fault-free operation and when there is no release signal $U_F$ the voltages $u_o$ and $u_u$ on the lines 5 and 6, respectively, have decayed via the diodes 12 and 20, respectively, and the resistor 14 virtually to reference potential. Such a fault may be, for example, a short circuit between the operating voltage $U_B$ and the line 5. This also includes a short circuit of the final control element 7' after overloading. Such a fault may also occur when there is a short circuit between the input and the output of the combinational circuit 2'. The evaluation of the switching signal $U_S$ in dependence on the release signal $U_F$, described above in a general form, can be automated by means of logical combinational elements interconnected in an appropriate way, so that, in the case of a fault, either switching off or initially only fault signaling takes place.

Figure 6:
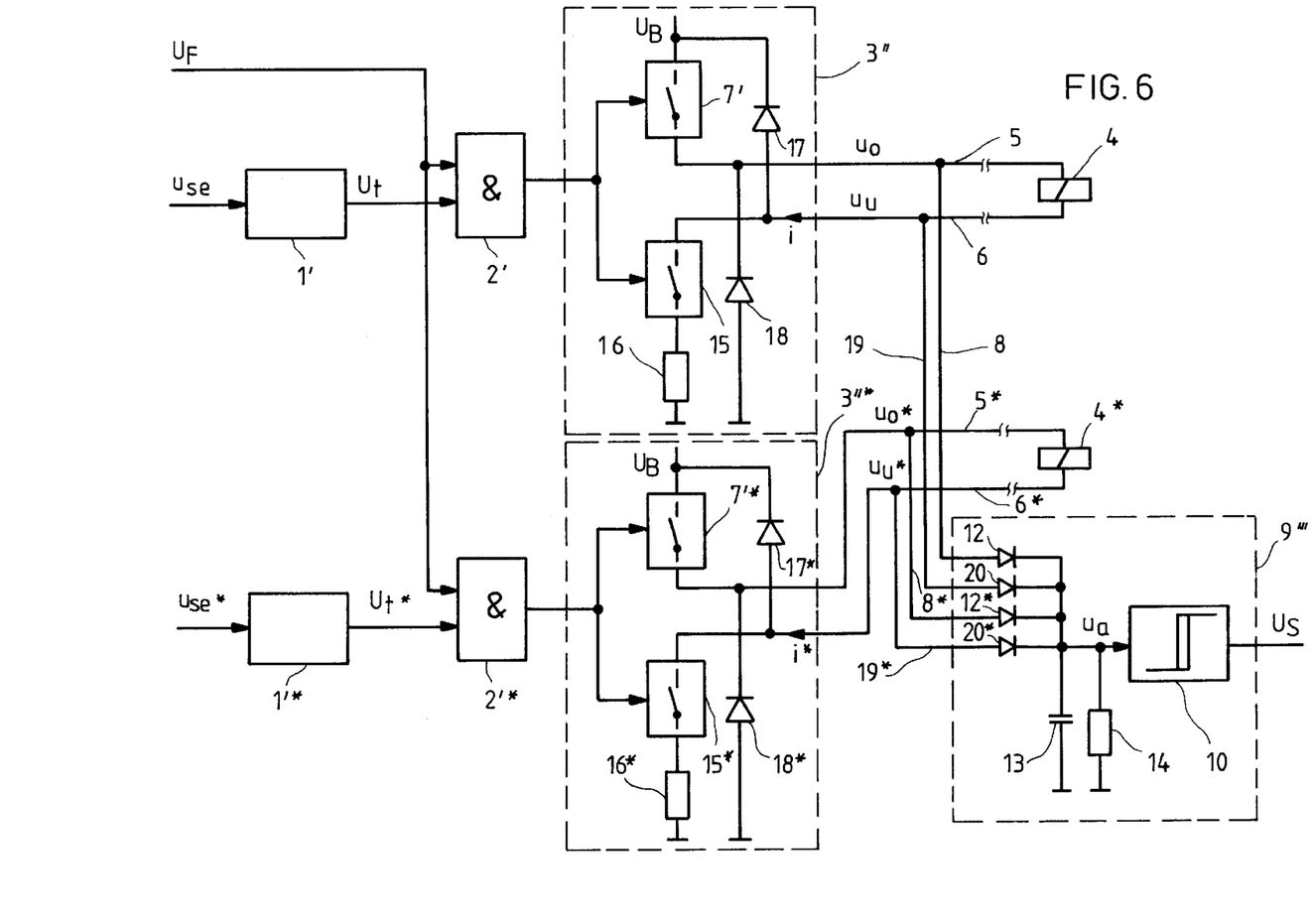
FIG. 6 shows in schematic representation the circuit diagram of two actuators according to the invention with an evaluation circuit shared by both actuators.

FIG. 6 shows the circuit diagram of two actuators according to the invention. In addition to the actuator represented in FIG. 4, a further, identically constructed actuator is provided. The designations of the components of the additional actuator are additionally provided with a "*" to distinguish from the corresponding components of the actuator represented in FIG. 4. The combinational circuits 2' and 2'\* are fed the same release signal $U_F$. When operating properly, current can flow via the magnetic coils 4 or 4\* only when the release signal $U_F$ is available. Instead of two separate evaluation circuits, a common evaluation circuit 9''' is provided for both actuators. The line 5\* is connected via a line 8\* and a diode 12\* to the input of the threshold switch 10. The line 6\* is connected via a line 19\* and a diode 20\* to the input of the threshold switch 10. The input of the threshold switch 10 is consequently fed in each case the greatest of the voltages on the lines 5, 6, 5\* and 6\* as voltage $u_a$. Only if the voltage $u_a$ is less than the threshold voltage $U_{a0}$ does the switching signal $U_S$ change from the logical value "1" to the logical value "0". The logical value "0" of the switching signal $U_S$ ensures that the voltages on the lines 5, 6, 5\* and 6\* are virtually at reference potential. If this condition is satisfied after a change of the release signal $U_F$ from the logical value "1" to the logical value "0", fault-free operation can be assumed.

In FIG. 6, both the voltages $u_o$ and $u_{o^*}$ and the voltages $u_u$ and $u_{u^*}$ are fed to the evaluation circuit 9'''. It is also possible, however, in a way corresponding to the actuator represented in FIG. 2, to feed only the voltages $u_o$ and $u_{o^*}$ to the evaluation circuit.

We claim:

1. An electromagnetic actuator comprising a control circuit, a combinational circuit, and a power section having at least one final control element, wherein the power section is operative with a magnetic coil suitable for activation of hydraulic valve upon connection of the magnetic coil via electrical lines to an output of the power section, said at least one final control element being connected electrically in series between a source of operating voltage ($U_B$) and said output of the power section; the combinational circuit passes on an output signal of the control circuit to the power section only when, in addition to the output signal of the control circuit, the combinational circuit is fed a release signal; and, upon connection of the magnetic coil to the power section, the power section effects a current flow from an operating voltage via said at least one final control element and the magnetic coil to a reference potential to correspond to the output signal of the control circuit passed on by the combinational circuit, wherein the voltage ($u_o$) of that line (5) which is supplied with the operating voltage ($U_B$) via said at least one final control element (7; 7') upon activation of the power section (3; 3') is fed to an evaluation circuit (9; 9'), and the evaluation circuit (9; 9') has a threshold switch (10) which converts the voltage ($u_a$) fed to it into a switching signal ($U_S$), the threshold voltage ($U_{a0}$) of the threshold switch (10) being slightly greater than the reference potential ($\perp$).

2. An electromagnetic actuator comprising a control circuit, a combinational circuit, and a power section having at least one final control element, wherein the power section is operative with a magnetic coil suitable for activation of a hydraulic valve upon connection of the magnetic coil via electrical lines to an output of the power section; the combinational circuit passes on an output signal of the control circuit to the power section only when, in addition to the output signal of the control circuit, the combinational circuit is fed a release signal; and upon connection of the magnetic coil to the power section, the power section effects a current flow from an operating voltage via said at least one final control element and the magnetic coil to a reference potential to correspond to the output signal of the control circuit passed on by the combinational circuit, wherein the voltage ($u_o$) of that line (5) which is supplied with the operating voltage ($U_B$) on activation of the power section (3; 3') via the at least one final control element (7; 7') is fed to an evaluation circuit (9; 9') and the evaluation circuit (9; 9') has a threshold switch (10) which converts the voltage ($u_a$) fed to it into a switching signal ($U_S$), the threshold voltage ($U_{a0}$) of the threshold switch (10) being slightly greater than the reference potential ($\perp$), and the actuator further comprising a diode (12) arranged between the input of the evaluation circuit (9') and the input of the threshold switch (10), and a parallel connection of a capacitor (13) and a resistor (14) is arranged between the input of the threshold switch (10) and the reference potential ($\perp$).

3. The actuator as claimed in claim 2, wherein a product of resistance value of the resistor (14) and capacitance of the capacitor (13) is greater than a time constant with which the current (i) flowing via the magnetic coil (4) decays when the final control element (7') is non-conducting.

4. The actuator as claimed in claim 2, wherein voltage ($u_u$) of other line (6) leading from the power section (3") to the magnetic coil (4) is fed to a second input of the evaluation circuit (9") and a second diode (20) is arranged between the second input of the evaluation circuit (9") and the input of the threshold switch (10).

5. The actuator as claimed in claim 3, wherein the resistance value of the resistor (14) is at least two orders of magnitude greater than ohmic resistance of the magnetic coil (4).

6. The actuator as claimed in claim 2, for more than one actuator, wherein a magnetic coil (4, 4\*) is respectively connected via two lines (5, 6 and **5\*, 6\*, respectively) to in each case a power section (3", 3"\*), a common evaluation circuit (9''') with a threshold switch (10) is provided and the lines (5, 6, 5\*, 6\*) leading from the power sections (3", 3"\*) to the magnetic coils (4, 4\*), or at least the lines (5, 5\*) via which the magnetic coils (4, 4\*) are supplied with the operating voltage ($U_B$) on activation of the respective power section (3" and 3"\*, respectively), are connected via in each case a diode (12, 20, 12\*, 20\*) to the input of the threshold switch (10**).

7. The actuator as claimed in claim 4, wherein the resistance value of the resistor (14) is at least two orders of magnitude greater than ohmic resistance of the magnetic coil (4).

* * * * *